United States Patent [19]

Biller et al.

[11] Patent Number: 4,615,532
[45] Date of Patent: Oct. 7, 1986

[54] LOCKING BALLS FOR LOGGING CARRIAGE

[75] Inventors: Cleveland J. Biller; David D. Johnson, both of Morgantown, W. Va.

[73] Assignee: The United States of America as represented by the Secretary of Agriculture, Washington, D.C.

[21] Appl. No.: 650,587

[22] Filed: Sep. 14, 1984

[51] Int. Cl.[4] .............................................. F16G 11/00
[52] U.S. Cl. .................................... 279/32; 24/115 M; 24/122.6; 24/136 R; 403/356; 403/370; 403/371
[58] Field of Search ...................... 279/32, 42, 99–101; 24/136 R, 136 L, 115 M, 122.3, 122.6, 135 R, 135 K, 135 L, 135 B; 403/367–371, 356–358, 374; 285/322, 332.1, 332.2, 332.4, 333, 323, 332

[56] References Cited

U.S. PATENT DOCUMENTS

| 231,751 | 8/1880 | Bailey et al. | 403/368 |
| 504,522 | 9/1893 | Donahue. | |
| 529,933 | 11/1894 | Mullen | 403/370 |
| 1,710,416 | 4/1929 | Goeller | 403/370 X |
| 4,351,257 | 9/1982 | Brown, Jr. . | |
| 4,367,982 | 1/1983 | Hubbard . | |

FOREIGN PATENT DOCUMENTS

| 163340 | 6/1921 | United Kingdom | 24/136 R |
| 1390025 | 4/1975 | United Kingdom | 403/370 |

OTHER PUBLICATIONS

Bolted Locking Ball, date unknown, drawing from product specification sheet of Christy Company.

Primary Examiner—Gil Weidenfeld
Assistant Examiner—Steven C. Bishop
Attorney, Agent, or Firm—M. Howard Silverstein; David G. McConnell

[57] ABSTRACT

A ball stop is locked to a cable by inserting the cable through an opening in the ball. The ball is then rigidly clamped in place by a wedge which is inserted into the aperture surrounding the cable and threads in the aperture and on the external part of the wedge mate and are screwed together to cam the wedge into frictional engagement with the cable.

1 Claim, 4 Drawing Figures

LOCKING BALLS FOR LOGGING CARRIAGE

FIELD OF THE INVENTION

This invention relates to a ball to be mounted on the exterior surface of a cable which is incorporated in an apparatus for conveying logs from one place to another which uses a skyline cable as part of the apparatus.

BACKGROUND OF THE INVENTION

The currently used device in most logging operations involves a solid metallic ball having two apertures at right angles extending completely through the ball and intersecting each other at the center of the ball. The cable is inserted through one of the apertures and the ball is moved longitudinally along until it is located at the desirable spot. Then a spike is driven through the cable and through the other aperture in the ball, the spike extending perpendicular to the aperture in which the cable has been threaded. The obvious disadvantage is that driving the spike through the cable tends to weaken the cable structure at that point. There may be other companies in the business of making such devices, but the one known is the Christy Company.

An alternative embodiment is a pair of semi-spherical elements bolted together over a cable.

The functional equivalent of the Christy ball is a knot tied in a rope illustrated in U.S. Pat. No. 504,522 to Donahue. But tying a knot in a one inch steel cable is not only physically impractical, but is also a structure which would tend to weaken the cable itself.

U.S. Pat. No. 4,351,257 to Brown involves a fender used in marine applications but also discloses a way of locking an attachment to a cable.

U.S. Pat. No. 4,367,982 to Hubbard discloses attaching a stopping mechanism to a cable involved in marine applications by the method of a pressure screw threaded perpendicular to the cable and into frictional engagement therewith. It is obvious that the transverse compression of the cable would tend to weaken it, particularly because of the limited bearing area of the pressure pin on the cable.

SUMMARY OF THE INVENTION

There are two embodiments involved and each includes a ball having a single bore or cavity therethrough which will be fitted over a cable and moved to an appropriate spot along the cable. At that point a wedging device is inserted into the bore around the cable and the wedging device is clamped into movement free engagement with the cable by tapering threads on the internal surface of the bore which receives the cable and the wedge surrounding it.

The specific objects of the invention will be understood from an observation of the drawings and a reading of the description of the preferred embodiments which follow.

DESCRIPTION OF THE PREFERRED EMBODIMENTS

Figure 1:
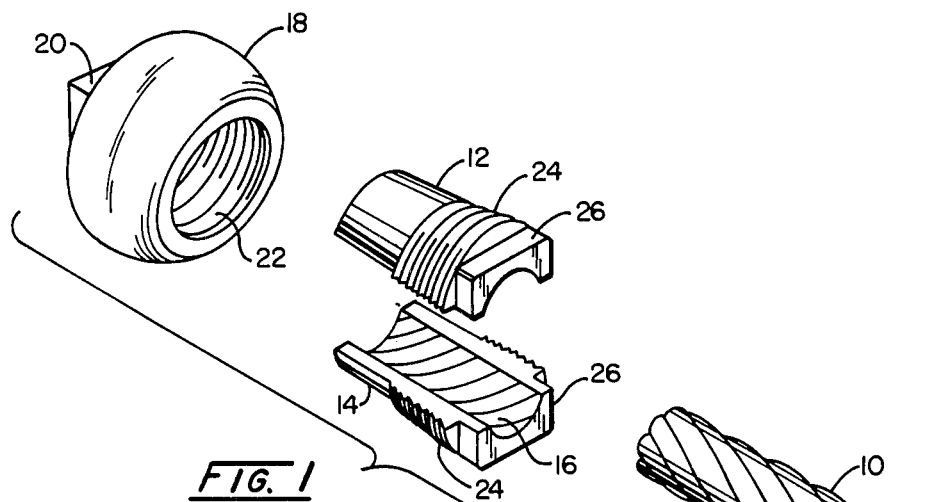
FIG. 1 is an exploded perspective view of an internally threaded ball having a bore designed to receive a cable and a pair of externally threaded tapering wedges.

FIG. 1 is an exploded view of a means for locking a ball to a cable. The cable 10 is elongated and may have a bunch of logs at one end and a winch at the other end.

Figure 2:
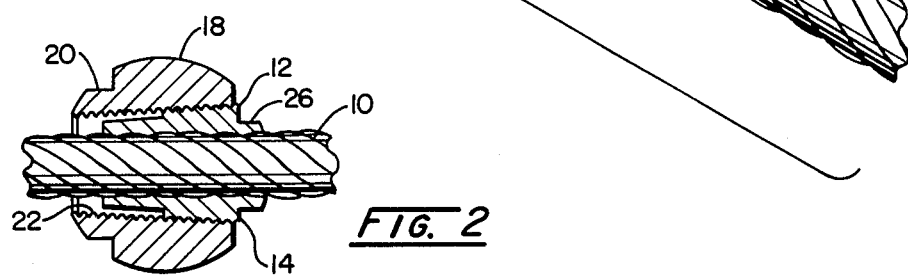
FIG. 2 is a sectional view of the ball of FIG. 1 mounted in operative position.

As best seen in FIG. 2, a pair of wedges 12, 14, each having a tapered serrated internal surface 16 configured to engage the external surface of cable 10, are clamped around the cable when threaded into ball 18.

Preferably the ball 18 is generally spherical in shape except for the end opposite to where the wedges 12, 14 are inserted; said opposite end includes wrench flats 20 whose function will be explained subsequently.

The internal surface 22 of the ball is generally cone shaped with the converging end being in the direction of the wrench flats 20. The cone shaped surface 22 has an axis which will be substantially coextensive with the axis of the cable 10 when it is locked in proper position. Threads 24 are on the external surface of each of the wedges 12, 14 and are designed to engage corresponding threads formed in cone shaped surface 22.

In operation, one end of cable 10 will be inserted through the aperture in ball 18 defined by the cone shaped surface 22 and the ball will be moved to a desirable location on the cable. At that point wedge portions 12, 14 will be applied, one on each side of the cable, and the ball 18 will be threadedly tightened on the wedges 12, 14 by use of a manually operated wrench (not shown) which engages wrench flats 20. A corresponding manually operated wrench will be used on wrench flats 26 on the wedges.

The invention involved will serve the very useful purpose of providing a very rigid stop means for the cable which will limit its movement in one direction, but the ball 18 may be removed by a simple manual operation and applied to a different place on the cable. All of this will be accomplished without penetration, compressing or damaging of the cable itself to any great extent. Obviously some very minor compression will occur but compared to the apparatus currently available the compression damage is insignificant.

Figure 3:
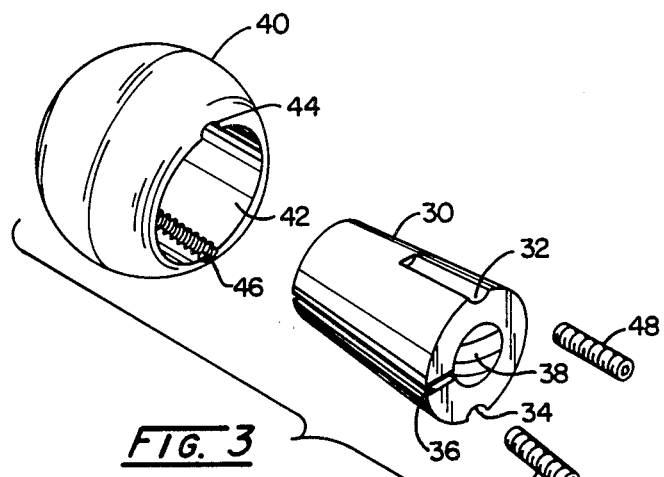
FIG. 3 is an alternative embodiment to FIG. 1 where the wedges are one piece, split longitudinally along one side and clamped into position by diagonally opposed screws.
Figure 4:
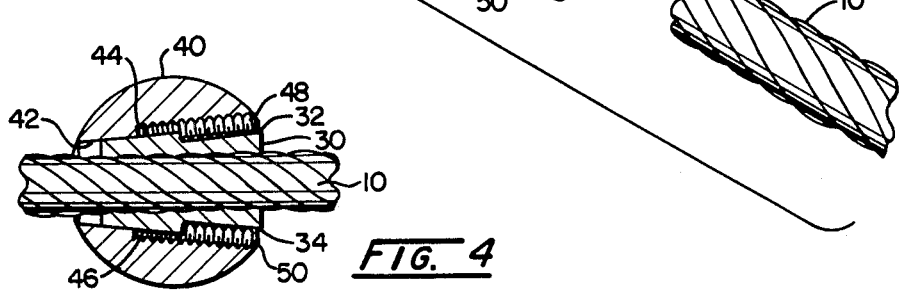
FIG. 4 is a sectional view of the ball and cable combination of FIG. 3 mounted in operative position.

FIGS. 3 and 4 illustrate an alternative embodiment not requiring wrench flats on the ball or the wedges for assembly. In this latter case, the wedge portion 30 has a substantially smooth external tapering cone shaped surface except for a pair of semi-circular depressions 32, 34 diagonally opposite each other on the wedge. Wedge 30 extends almost completely around the cable 10 except for the longitundinal split 36 which allows wedge 30 to expand and contract radially. The internal surface of wedge 30 may include serrations 38 corresponding in function to serrations 16 on wedges 12 and 14. The serrations could, of course, conform to the grooves in the cable if desired.

Ball 40 is generally spherical in shape and includes a cone shaped aperture 42. Outwardly projecting threaded depressions 44 and 46 are formed in the surface of the aperture which are designed to mate with depressions 32, 34 in the wedge 30 to form a pair of generally circular openings having axes converging toward the axis of the cone shaped surface 42 in a direction toward the small end of the cone or from right to left as shown in FIG. 4.

Machine screws 48, 50 are of a diameter to fit into the circular openings formed by the depressions in the cone shaped surface and the wedge. As illustrated, the machine screws are designed to be rotated by an Allen wrench inserted into the exposed end.

In operation the ball 40 and wedge 30 will be applied to the cable 10 and will slide along until the desired location is achieved. Then the wedge 30 will be moved into the cone shaped surface 42. The screws 48, 50 will bear on the innermost end of depressions 32, 34. Because depressions 32, 34 are smooth and depressions 44, 46 are threaded, tightening of the screws will draw the ball 40 over the wedge 30 and radially compress the wedge into frictional engagement with the cable 10.

Having thus described the invention in its preferred embodiment it will be recognized by those having ordinary skill in the art that various modifications may be made without departing from the spirit of the invention. Accordingly, it is not intended that the drawings showing the invention nor the words used to describe the same be limiting on the invention. Rather it is intended that the invention be limited only by the scope of the appended claims.

We claim:

1. In the combination of a ball and a braided cable, means for locking the ball in position with respect to said cable, the exterior surface of said cable including spirally extending grooves formed by the braids, said cable being elongated and projecting through a cone shaped aperture in said ball, said aperture extending completely through the ball with its axis extending substantially coextensively with that of the cable, screw threads being formed in the surface of the cone shaped aperture, said locking means comprising a wedge, said wedge including an internal surface configured to partially circumscribe the cable, means including the threads of the aperture and the external surface of said wedge for (1) compressing the wedge on the cable while in the aperture while (2) at the same time exerting outward pressure on the cone shaped surface of the aperture, serrations on the surface of the wedge in engagement with the cable, said serrations being configured to mate with the grooves in the surface of said cable, the wedge extending almost completely around the cable except for a single, longitudinally extending split allowing the wedge to expand and contract radially, a pair of machine threaded screws, each of said screws being threaded into a generally circular opening formed by a threaded depression in the surface of the cone shaped aperture and an oppositely extending depression in the surface of the wedge, each said circular opening having an axis converging toward said cone axis in a direction toward the smaller end of the cone, said depressions being disposed on opposite sides of said cone.

* * * * *